June 2, 1931. T. R. POST 1,807,751
COTTON PICKER
Original Filed Nov. 13, 1926 4 Sheets-Sheet 1
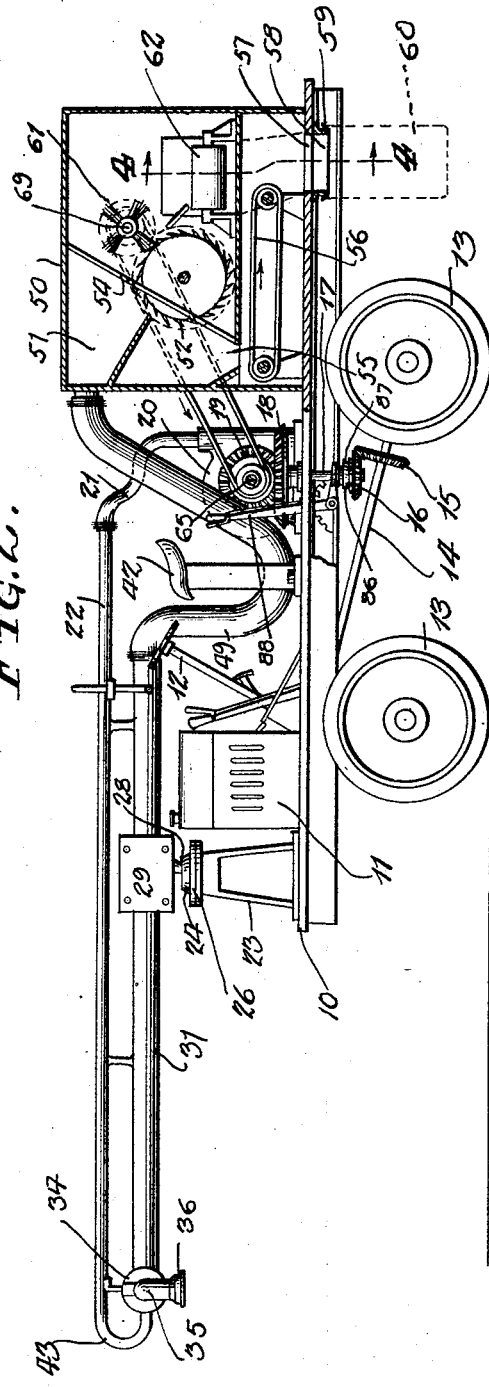
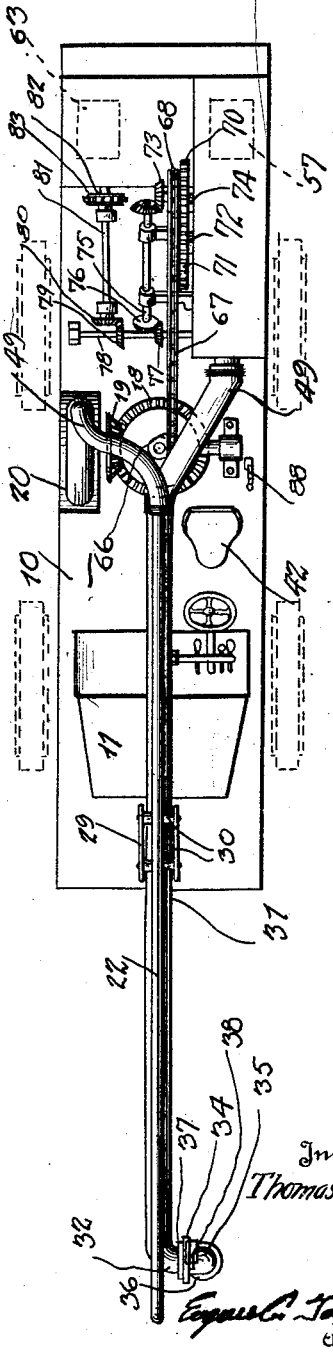
Inventor
Thomas R. Post
By
Eugene C. Taylor
Attorney June 2, 1931.   T. R. POST   1,807,751
COTTON PICKER
Original Filed Nov. 13, 1926   4 Sheets-Sheet 3
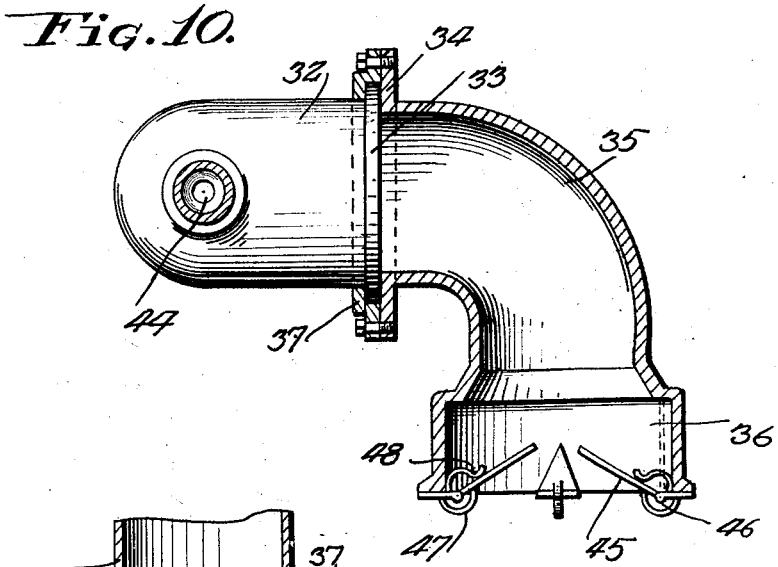
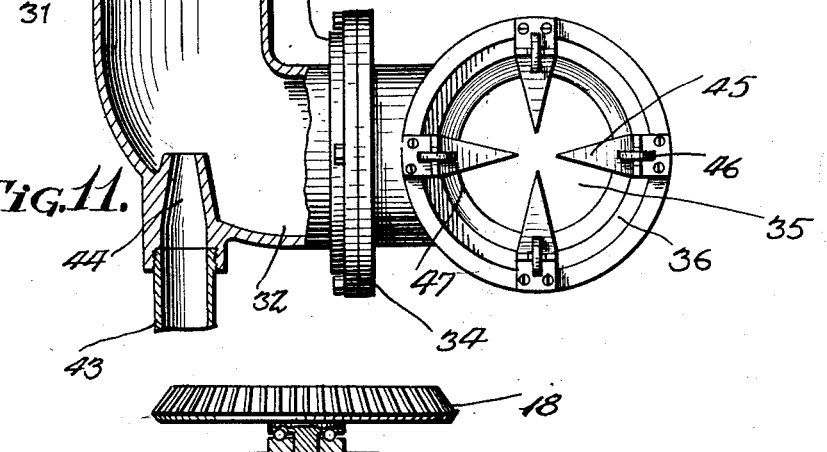
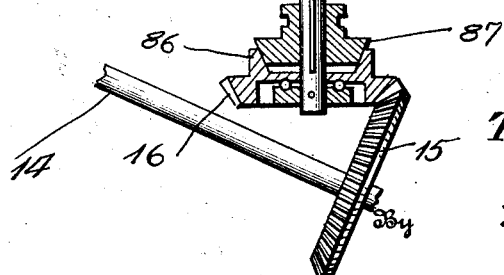
Inventor
Thomas R. Post.
By Eugene C. Taylor
Attorney

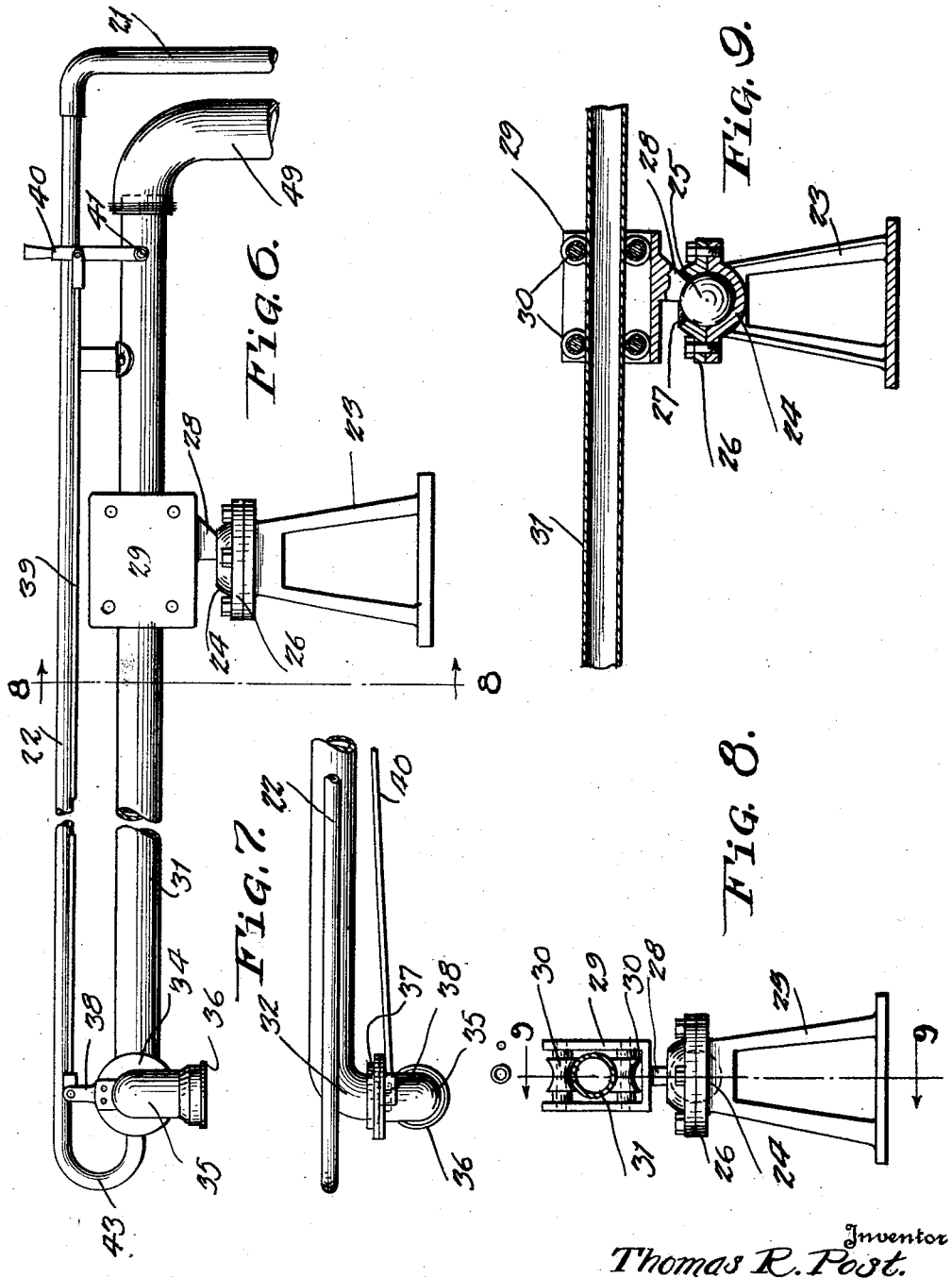

Patented June 2, 1931

1,807,751

UNITED STATES PATENT OFFICE

THOMAS R. POST, OF WILMINGTON, NORTH CAROLINA

COTTON PICKER

Substitute for application Serial No. 148,242, filed November 13, 1926. This application filed February 23, 1928. Serial No. 256,457.

This invention relates to cotton pickers.

Many cotton pickers have been devised and some of these have the mechanism carried around on truck or automobile, flexible tubes being carried in front of the machine by operatives for sucking or catching the cotton, removing it from the squares and conveying it back to suitable apparatus. Also efforts have been made to combine the picking apparatus with a ginning device so that the ginning operation could be carried on simultaneously with the picking.

One object of the present machine is to provide an improved cotton picker wherein the picking mechanism is under the control of and manipulated by the operator of the machine so that there is no necessity of having several operatives, but one man does all the work.

A second important object of the machine is to provide a device of this character wherein great economy will be effected in the gathering and ginning of cotton.

A third important object of the invention is to provide a very simple machine of this character wherein the cotton is gathered, the lint and seed separated and each conveyed to and deposited in a suitable bag or receptacle.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a plan view of a cotton picker constructed in accordance with this invention.

Figure 2 is a side elevation thereof, partly in section.

Figure 5 is a detail view of a certain clutch mechanism used herewith.

Figure 6 is an enlarged side elevation of the picking and pneumatic conveying mechanism.

Figure 7 is a plan view of the mouth and adjacent parts of the mechanism shown in Figure 6.

Figure 8 is a detail section on the line 8—8 of Figure 6.

Figure 9 is a detail section on the line 9—9 of Figure 8.

Figure 10 is an enlarged detail view of the mouth showing the swivel arrangement, the view being partly in section.

Figure 11 is a bottom plan view of the part shown in Figure 10, this view being likewise partly in section.

Figure 3:
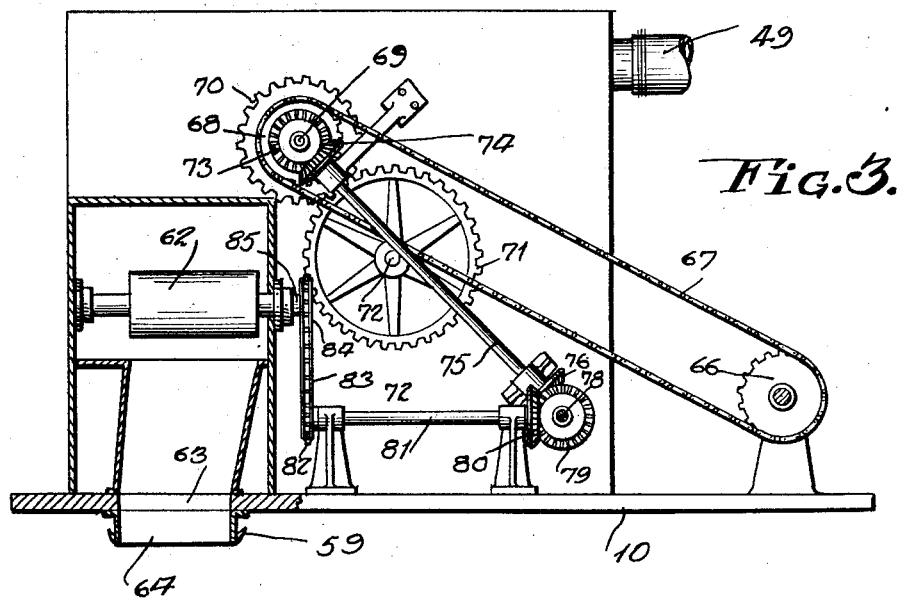
Figure 3 is an enlarged view from the opposite side, partly in section, and disclosing the gearing arrangement for driving the various elements, certain parts being omitted in order to more clearly illustrate the remaining parts.
Figure 4:
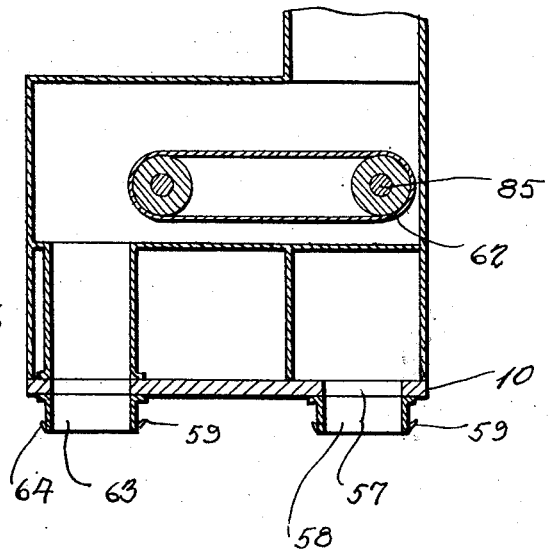
Figure 4 is a detail section to an enlarged scale on the line 4—4 of Figure 2.

In the embodiment of the invention here shown there is indicated a platform 10 which is mounted on a suitable automobile truck or chassis, the usual engine housing being indicated at 11 the driving and steering mechanism at 12 and the supporting wheels at 13. The main drive shaft is also indicated at 14. Other parts such as springs and the like are omitted for the sake of more clearly showing the invention itself and not confusing the same with the ordinary automobile construction. It is to be understood, however, that the construction is that of the ordinary automobile except for the fact that the shaft 14 is of the type which is constantly driven, the clutching and unclutching device being located at the rear of the machine and not shown. However, it is to be understood that this shaft 14 is merely indicative of one method of driving the moving parts of the automobile from the automobile engine and I do not confine myself to any particular method of driving such moving parts from the engine as the special means employed forms no part of the present invention, it being sufficient that some method of so driving is used. In the present instance the shaft 14 is shown as provided with a beveled gear 15 which meshes with a bevel gear 16 mounted on the main drive shaft 17 which extends vertically through the platform 10 and carries on its upper end a beveled driving gear 18.

This gear 18 meshes with a bevel gear 19 mounted on the shaft of a blower 20 arranged to deliver air under considerable pressure to a flexible tube 21 which connects with the rear end of a tube 22 which passes forwardly and projects from the front of the platform. On the front of the platform is a standard 23 having in its upper end a ball socket 24 wherein rests a ball 25 which is held in the socket by a cover plate 26 provided with a suitable opening 27 through which passes the shank 28 of said ball. This shank 28 supports a U-shaped frame 29 provided with spaced pairs of bearing rollers 30 between which is supported a conveyor tube 31 which bends at its forward end at right angles, the bent portion 32 lying normally in a horizontal position and being provided with a flange 33 which bears against a flange 34 formed on an elbow 35 having an open mouth end 36. The flanges 33 and 34 are held together by a cover plate 37 and thus the mouth can swivel on the right angular portion 32 and, as seen in Figures 2 and 6, can be inclined forwardly or rearwardly at will. This forward and rearward movement is controlled by the operator through the medium of an arm 38 fixed to the elbow flange 34 and connected by a rod 39 with a lever 40 pivotally mounted on an operating arm or handle 41 which projects laterally from the tube 31 in front of the operator's seat 42. Thus by grasping the arm 41 with the left hand and the lever 40 with the right hand the operator is enabled to move the tube forwardly or rearwardly, swing it in any direction, and tilt it up and down. I may also incline the mouth in any direction by rotating the tube 31 and manipulating the handle 40. It will be observed that the pipe or tube 22 is provided at its forward end with a return bend 43 which connects with a nozzle member 44 arranged on the bend 32 axially of the pipe 31. By this means when the blower is operated a forcible jet of air is blown into the forward end of the tube 31 and sets up a heavy suction in the mouth 36 in the usual manner. Furthermore, this mouth 36 is provided with a series of light fingers 35 which are pivoted at 45 to the periphery of the mouth and inclined normally inward of said mouth. These fingers are held from too great movement toward the opening of the mouth by stop members 47 and are pressed toward said opening by light springs 48. By this means when the mouth is dropped over a boll by the operator the cotton engages the points of the fingers and if the suction itself is not sufficient to draw it out of the square or boll, the mouth may be lifted and the fingers will effectively remove the cotton. Owing to the inclination of the fingers and the ease with which they move inwardly the suction will then strip the cotton off the fingers and the air jet will carry it back through the pipe 31. The rear end of the pipe 31 is connected by a flexible tube 49 to a gin housing 50, opening into the hopper 51 so that the cotton engages the gin saws 52 and is drawn through between the bars 54, the seed being left behind and dropping through a hopper 55 onto a conveyor belt 56 which carries the seed rearwardly and dumps it through an opening 57 in the rear end of the platform, this opening being surrounded by a support 58 having prongs 59 which may engage the mouth of a bag indicated in dotted lines at 60. The cotton or lint which is drawn through the bars 54 is stripped from the saw teeth by a doffer 61 which delivers it to a transverse conveyor 62. This conveyor carries the cotton over to and dumps it through an opening 63 similar to the opening 57 and similarly provided with a bag support 64.

In order to drive the various elements the shaft 65 of the blower 20 had mounted thereon a sprocket wheel 66 which is connected by a sprocket chain 67 with a sprocket wheel 68 on the shaft 69 of the doffer. On this shaft 69 is also mounted a gear 70 which meshes with a gear 71 fixed on the shaft 72 of the gin saws. In addition, the shaft 69 carries a bevel gear 73 which meshes with a gear 74 mounted on a shaft 75 and carrying a bevel gear 76. This bevel gear meshes with a bevel gear 77 fixed on the shaft 78 at one end of the conveyor 56. On this shaft 78 is a second bevel gear 79 which meshes with a bevel gear 80 fixed on a longitudinally extending shaft 81 which carries at its rear end a sprocket wheel 82 which is connected by a sprocket chain 83 with a sprocket wheel 84 fixed on the shaft 85 at one end of the transverse conveyor 62. By this means when one part of the device is driven all of the moving parts are driven.

Connected to the gear 16, which revolves freely on the shaft 17, is a clutch member 86 while a co-acting clutch member 87 is splined on the shaft 17 and may be moved into and out of engagement with the clutch member 86 by means of a lever 88 extending adjacent the driver's seat 72, the lever being of the usual latch lever type. By this means the apparatus may be disconnected from the engine or connected thereto at the will of the operator.

This application covers the subject-matter of application Serial No. 148,242, for cotton picker, filed November 13, 1926, and which became abandoned. Said application was divided and application Serial No. 184,333 for cotton picker suction tubes filed April 16, 1927. The latter application covers the suction tube or nozzle shown in Figures 10 and 11 of this application.

From the foregoing it will be seen that there has been provided a simple apparatus wherein one man may drive the automobile through a cotton field and gather and gin the cotton. It is of course advisable to have a second operative handle the filled bags and supply empty ones; otherwise the operation is entirely a one man operation.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a cotton picker of the pneumatic type, a wheel supported movable platform, a support at the forward end of said platform having a swivel joint at its upper end, a pneumatic tube carried by the joint and projecting in advance of the platform, said tube being mounted for reciprocation on means carried by said joint, and a cotton boll engaging mouth on the forward end of said tube.

2. In a cotton picker of the pneumatic type, a wheel supported movable platform, a support at the forward end of said platform, a universal joint carried by the support, a rigid pneumatic tube carried by said joint and projecting in advance of the platform, said tube being mounted for reciprocation through means mounted on said joint, and a cotton gathering mouth on the forward end of said tube.

3. In a cotton picker of the pneumatic type, a wheel supported movable platform, a support at the forward end of said platform having a swivel joint at its upper end, a pneumatic tube carried by the joint and slidable with reference thereto in a direction longitudinal of the tube and projecting in advance of the platform, and a cotton boll engaging mouth on the forward end of said tube.

4. In a cotton picker of the pneumatic type, a wheel supported movable platform, a support on the forward end of said platform, a universal joint carried by the support, a rigid pneumatic tube carried by said joint and slidable with reference thereto in a direction longitudinal of the tube and projecting in advance of the platform, and a cotton gathering mouth on the forward end of said tube.

5. In a cotton picker of the pneumatic type, a wheel supported movable platform, a support at the forward end of said platform having a swivel joint at its upper end, a pneumatic tube carried by the joint and mounted for reciprocation thereon and projecting in advance of the platform, a cotton boll engaging mouth on the forward end of said tube, a swivel connection between said mouth and tube, and means operable from the platform and connected to the mouth for adjusting the same on its swivel connection.

6. In a cotton picker of the pneumatic type, a wheel supported movable platform, a support at the forward end of said platform, a universal joint carried by the support, a rigid pneumatic tube carried by said joint and mounted for reciprocation thereon and projecting in advance of the platform, a cotton gathering mouth on the forward end of said tube, a swivel connection between said mouth and tube, and means operable from the platform connected to the mouth for adjusting the same on its swivel connection.

7. In a cotton picker of the pneumatic type, a wheel supported movable platform, a support at the forward end of said platform having a swivel joint at its upper end, a pneumatic tube carried by the joint and slidable with reference thereto in a direction longitudinal of the tube and projecting in advance of the platform, a cotton boll engaging mouth on the forward end of said tube, a swivel connection between said mouth and tube, and means operable from the platform connected to the mouth for adjusting the same on the swivel connection.

8. In a cotton picker of the pneumatic type, a wheel supported movable platform, a support on the forward end of said platform, a universal joint carried by the support, a rigid pneumatic tube carried by said joint and slidable with reference thereto in a direction longitudinal of the tube and projecting in advance of the platform, a cotton gathering mouth on the forward end of said tube, a swivel connection between said mouth and tube, and means operable from the platform connected to the mouth for adjusting the same on its swivel connection.

9. In a cotton picker of the pneumatic type, a wheel supported movable platform, a support at the forward end of said platform, a guide yoke universally jointed to said support and having spaced pairs of guide rollers, a rigid pneumatic tube supported between said rollers and slidable and rotatable in the yoke, and a mouth at the forward end of said tube for engaging cotton bolls and receiving cotton therefrom.

10. In a cotton picker of the pneumatic type, a wheel supported movable platform, a support at the forward end of said platform, a guide yoke universally jointed to said support and having spaced pairs of guide rollers, a rigid pneumatic tube supported between said rollers and slidable and rotatable in the yoke, a mouth at the forward end of said tube for engaging cotton bolls and receiving cotton therefrom, a swivel connection between said mouth and tube, and means operable from the platform connected to the mouth for adjusting the same on its swivel connection.

11. In a cotton picker of the pneumtic type, a wheel supported movable platform, a support at the forward end of said platform having a swivel joint at its upper end, a pneumatic tube carried by the joint and mounted for reciprocation thereon and projecting in advance of the platform, a cotton boll engaging mouth on the forward end of said tube, a gin housing on said platform, and a flexible tubular connection between the rear end of said tube and said gin housing.

12. In a cotton picker of the pneumatic type, a wheel supported movable platform, a support at the forward end of said platform, a universal joint carried by the support, a rigid pneumatic tube carried by said joint and projecting in advance of the platform, a cotton gathering mouth on the forward end of said tube, a gin housing on said platform, and a flexible tubular connection between the rear end of said tube and said gin housing to permit movement of said tube with respect to said support by means of said universal joint.

13. In a cotton picker of the pneumatic type, a wheel supported movable platform, a support at the forward end of said platform having a swivel joint at its upper end, a pneumatic tube carried by the joint and slidable with reference thereto in a direction longitudinal of the tube and projecting in advance of the platform, a cotton boll engaging mouth on the forward end of said tube, a gin housing on said platform, and a flexible tubular connection between the rear end of said tube and said gin housing.

14. In a cotton picker of the pneumatic type, a wheel supported movable platform, a support on the forward end of said platform, a universal joint carried by the support, a rigid pneumatic tube carried by said joint and slidable with reference thereto in a direction longitudinal of the tube and projecting in advance of the platform, a cotton gathering mouth on the forward end of said tube, a gin housing on said platform, and a flexible tubular connection between the rear end of said tube and said gin housing.

15. In a cotton picker of the pneumatic type, a self-propelled vehicle having a platform and a driver's seat thereon, a support at the forward end of the platform, a guide yoke universally jointed to said support, a rigid pneumatic tube supported in said guide yoke and rotatable and slidable in said yoke, a cotton picking mouth at the forward end of said tube and means adjacent the driver's seat whereby the said tube may be manipulated to apply the said mouth to the cotton bolls.

16. In a cotton picker of the pneumatic type, a self-propelled vehicle having a platform and a driver's seat thereon, a support at the forward end of said platform, a guide yoke universally mounted on said support, a rigid pneumatic tube slidable and rotatable in said yoke, a pivoted mouth piece on the forward end of said tube, and means on said tube and located adjacent the driver's seat whereby the tube may be manipulated and the mouth piece moved on its pivot to apply the mouth piece to cotton bolls and detach the same from the plant.

17. In a cotton picker of the pneumatic type, a self-propelled vehicle having a platform, a support on the forward end of said platform, a yoke universally mounted on said support, a rigid pneumatic tube slidable and rotatable in said yoke, and having a mouth piece at its forward end and extending angularly therefrom, a second pneumatic tube mounted on said first tube and supplying air thereto under pressure, said second tube opening into said first tube at its forward end and in line with its axis and means for supplying air under pressure to said first tube whereby suction is produced in said mouth piece to detach the cotton bolls and the cotton is forced through said first tube.

In testimony whereof I affix my signature.

THOMAS R. POST.